Sept. 20, 1960        M. A. BERGSTEDT ET AL        2,953,475
PRESSURE SENSITIVE ADHESIVE TAPE
Filed March 11, 1955
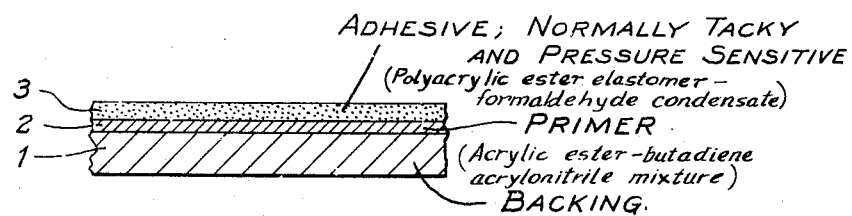
INVENTOR.
MILTON A. BERGSTEDT
BY KENNETH C. YOUNG
BENTON A. BULL
ATTORNEY United States Patent Office 2,953,475
Patented Sept. 20, 1960

2,953,475

PRESSURE SENSITIVE ADHESIVE TAPE

Milton A. Bergstedt, Linden, and Kenneth C. Young, New Brunswick, N.J., assignors, by mesne assignments, to Johnson & Johnson, New Brunswick, N.J., a corporation of New Jersey Filed Mar. 11, 1955, Ser. No. 493,810

12 Claims. (Cl. 117—72)

This invention relates to pressure-sensitive adhesive tapes and, more particularly, to pressure-sensitive adhesive tapes having excellent adhesive characteristics and resistance to hydrocarbon solvents.

Normally tacky and pressure-sensitive adhesive tapes have obtained wide usage in many commercial fields. Conventionally such pressure-sensitive adhesive tapes essentially comprise a suitable flexible backing and a normally tacky and pressure-sensitive adhesive coated thereon. Such adhesives are normally composed of a rubber, either natural or synthetic, and a resin compatible with the rubber and adapted to impart tack to the adhesive composition together with minor amounts of other additives such as rubber antioxidants, preservatives, fillers, etc. In view of the characteristics of the ingredients employed in such adhesives, it has been difficult, if not impossible, to formulate a normally tacky and pressure-sensitive adhesive which exhibits good adhesive characteristics and yet is not adversely affected by an environment of an essentially aliphatic hydrocarbon solvent. There are many uses for which such adhesives and tapes formed therewith would be admirably suited. For example, there are many applications for pressure-sensitive adhesive tapes as holding elements in the manufacture of electrical devices such as oil-filled transformers, impregnated cables, etc., and in the construction of aircraft assemblages where the tape might be exposed to an atmosphere of fuel vapors, e.g. high octane gasoline, jet engine fuel, etc. For such uses, it is, of course, necessary that the adhesive tape be such that the hydrocarbon solvents, with which it may come in contact, not destroy the tape per se nor destroy the adhesive characteristics of the tape.

Some suggestions have been made of pressure-sensitive adhesive tapes which are resistant to essentially aliphatic hydrocarbon solvents and having sufficient adhesive properties in their persons to be employed in such services. However, products formulated in accordance with such suggestions have not been found fully satisfactory for services of the type contemplated. Hence, there remains a problem in obtaining a pressure-sensitive adhesive tape having excellent resistance to essentially aliphatic hydrocarbon solvents and having the excellent characteristics normally attributed to normally tacky and pressure-sensitive adhesive tapes, such as good cohesiveness of the adhesive and good adhesion, hold and tack or quick stick.

Accordingly, it is an object of this invention to provide an essentially aliphatic hydrocarbon solvent resistant pressure-sensitive tape having good tape properties.

It is also an object of this invention to provide a normally tacky and pressure-sensitive adhesive tape whose adhesive will exhibit excellent properties of cohesiveness, hold, adhesion and quick stick before and after exposure to an environment of essentially aliphatic hydrocarbons.

It is a further and more specific object of this invention to provide a normally tacky and pressure-sensitive adhesive tape comprising a flexible backing sheet which is insoluble in essentially aliphatic hydrocarbon solvents coated on at least one major surface thereof with a normally tacky and pressure-sensitive adhesive which does not lose its properties upon exposure to such solvents.

These and other objects of the invention will become apparent when consideration is given to the following detailed description of the preferred normally tacky and pressure-sensitive adhesive tape of this invention.

In accordance with this invention, a normally tacky and pressure-sensitive adhesive tape, exhibiting excellent adhesive characteristics and resistance to destruction of its properties by essentially aliphatic hydrocarbon solvents, is formed by coating a suitable flexible web on at least one major surface thereof with a normally tacky and pressure-sensitive adhesive comprising an elastomeric polymer essentially composed of a polyacrylic acid ester of an aliphatic alcohol containing from one to four carbon atoms, and a resin adapted to, and present in the adhesive in amount sufficient to, render the adhesive tacky and pressure-sensitive at normal temperatures and comprising a formaldehyde condensate of a sulfonamide, phenol, melamine or urea, which exhibits the characteristics of substantial insolubility in water and aliphatic hydrocarbon solvents, and compatibility with the acrylic polymer. The adhesive may also include, if desired, suitable amounts of an aliphatic hydrocarbon insoluble plasticizer for such polymeric materials together with fillers, antioxidants, preservatives and similar minor additives conventionally employed in pressure-sensitive adhesive tapes.

As indicated, the elastomeric component of the adhesives employed in this invention is essentially composed of a polyacrylic acid ester of aliphatic alcohol containing from one to four carbon atoms. Exemplary of such esters are polymethyl acrylate, polyethyl acrylate, polypropyl acrylate, polyisopropyl acrylate, polybutyl acrylate, and polyisobutyl acrylate. Such elastomeric components may comprise such acrylates alone or a copolymer thereof with a monomer copolymerizable therewith such as another acrylic ester, unsaturated hydrocarbons such as butadiene, isoprene, styrene, acrylonitrile, vinyl ethers, vinyl esters, vinyl halides, vinylidene halides. Exemplary of such copolymers are ethyl acrylate and minor amounts (e.g. 5%, 12%) of acrylonitrile, a butyl acrylate and minor amounts of acrylonitrile, ethyl acrylate and minor amounts of halogenated vinyl ethers such as beta-chloro ethyl vinyl ether, methyl acrylate copolymerized with vinyl acetate, and the like. When the monomer polymerized with the acrylic ester forms an aliphatic hydrocarbon soluble homopolymer, it is essential that such a monomer comprise a minor amount of the copolymer. It has been found that the use of these polymers in combination with the tackifying resins hereinafter defined results in a normally tacky and pressure-sensitive adhesive tape exhibiting improved characteristics over those heretofore obtained with such polymers and, additionally, the important characteristic of substantial retention of properties upon exposure to essentially aliphatic hydrocarbon solvents.

As indicated, the resinous component of the adhesive must be of a composition and type adapted to render the adhesive tacky and pressure-sensitive when used in suitable amounts. The resins suitable for use in the invention comprise the formaldehyde condensates of sulfonamides, exemplified by the formaldehyde condensates of toluene sulfonamide and benzene sulfonamide; the formaldehyde condensates of unsubstituted or lower alkyl substituted phenols, having a formaldehyde to phenol ratio of approximately 1:1, and alkylated formaldehyde condensates of melamine and urea. In addition to exhibiting the characteristic of rendering the adhesive tacky and pressure sensitive, the suitable resins within these classes of formaldehyde condensates must also exhibit the characteristic of being substantially insoluble in water and essentially aliphatic hydrocarbon solvents, i.e. solvents a major proportion or all of which comprise a fraction from a distillate of aliphatic petroleum bases. Additionally, the resins must exhibit the characteristic of compatibility with the acrylic polymer. Such resins are employed in the composition in amount sufficient to render the adhesive tacky and sensitive to pressure, that is, capable of adhering to a surface to which it is applied upon the mere application of pressure, at normal room temperature. To this end the resins may be preferably employed in the composition in amount about 10 to 200 parts per 100 parts of the elastomeric component.

As indicated, the adhesive formulations in accordance with this invention may also include in their composition plasticizers, fillers and other minor additives for such products, such as preservatives, antioxidants, ultraviolet absorbers, etc. It is essential that the plasticizer include in the composition exhibit the characteristic of compatibility with the remaining components of the adhesive. Preferably, it should not be extractable from the adhesive by water or essentially aliphatic hydrocarbons. Suitable plasticizers for use in the invention include the alkyl glycol phthalates such as methyl glycol phthalate and ethyl glycol phthalate, butyl benzyl phthalate, diphenylcresyl phosphate, tricresyl phosphate and diphenyl phosphate. The plasticizer may be employed in the composition in amount approximately 20 to 130 parts per 100 parts of the elastomeric component.

Fillers which may be employed include aluminum hydrate, zinc oxide, calcium carbonate, and finely divided aluminum hydrate. As indicated in the copending application of Milton Alfred Bergstedt, Serial No. 504,358, filed April 27, 1955, now abandoned, the use of filler in polyacrylate acid ester based pressure-sensitive adhesives has associated with it the advantage of an increase in the adhesion, plasticity and resistance to cold flow characteristics of the adhesive. Similar benefits may be obtained in the use of filler in the adhesives of this invention. Such fillers when used are preferably employed in the composition in amount up to approximately 75 parts per 100 parts of the acrylate elastomer.

In the following table are given examples of various normally tacky and pressure-sensitive adhesives formed in accordance with this invention. There is also given an example of a normally tacky and pressure-sensitive adhesive formed with an elastomer other than the specific type defined in this invention. There are also given examples of adhesives formed from a composition similar to that defined in this invention except for the substitution of conventional tackifying resins for the specific class described herein. It will be appreciated that the compositions formed in accordance with this invention are exemplary and the invention is not to be considered limited to the specific materials and proportions outlined. Unless otherwise indicated, all proportions are in parts by weight. The adhesives formed according to the examples were coated on a commercially available flexible film of polyester resin and the tapes thus formed tested as indicated.

| | 1 | 2 | 3 | 4 | 5 | 6 | 7 |
|---|---|---|---|---|---|---|---|
| Copolymer ethyl acrylate and about 5% beta-chloro ethyl vinyl ether, Mooney Viscosity 80-95 (Hycar PA 4021) | 100 | 100 | 100 | 100 | 100 | 100 | ----- |
| Copolymer butadiene and 25% acrylonitrile, Mooney Viscosity 40-55 (Hycar OR-25) | ----- | ----- | ----- | ----- | ----- | ----- | 100 |
| Aryl sulfonamide-formaldehyde condensate, M.P. 30-40° C. (Santolite MS-80) | 90 | ----- | ----- | ----- | ----- | ----- | 197 |
| Aryl sulfonamide-formaldehyde condensate, M.P. 60-65° C. (Santolite MHP) | ----- | 60 | ----- | ----- | ----- | ----- | ----- |
| B-stage Liquid Formaldehydephenol condensate, Brookfield field Viscosity 7700 cps (Resinox 455) | ----- | ----- | 90 | ----- | ----- | ----- | ----- |
| Gasoline insoluble resin from pine wood, M.P. 116° C. (Vinsol) | ----- | ----- | ----- | 90 | ----- | ----- | ----- |
| Paracoumarone resin, M.P. 99-107° C., (Cumar MH-3) | ----- | ----- | ----- | ----- | 90 | ----- | ----- |
| Terpene resin, M.P. 115° C. | ----- | ----- | ----- | ----- | ----- | 90 | ----- |
| Methyl glycol phthalate | 30 | 30 | 30 | 30 | 30 | 30 | 26 |
| Adhesion to Alclad aluminum, oz./in | 60 | 24 | 50 | (¹) | 80 | (²) | 78 |
| Adhesion after Ageing | 40 | 46 | 36 | ----- | 4 | ----- | 40 |
| Adhesion after Jet Fuel immersion | 45 | 56 | 57 | ----- | 24 | ----- | 0 |
| Adhesion after Water immersion | 24 | 24 | 40 | ----- | 14 | ----- | 18 |
| Adhesion after U.V. Light exposure | 52 | 22 | 40 | ----- | 3 | ----- | 0 |
| Oil Immersion | P | P | P | ----- | F | ----- | P |
| Transparency | T | T | ³T | ----- | op. | ----- | op. |

¹ Tape cannot be unrolled.
² Polymer and resin incompatible in solution. Mass not coatable.
³ Colored.
P—passed. F—failed. T—transparent. op.—opaque.

*Adhesion to Alclad aluminum.*—One inch width tape was rolled once each direction with a 10-pound roller onto Alclad aluminum panel. Adhesion was measured under standard procedure (ASTM D–1000—48T) after 15 minutes of conditioning at room temperature. The stripping speed employed was 12 inches per minute.

*Adhesion after ageing.*—Adhesion was measured in accordance with the same procedure after exposure to accelerated ageing conditions of 150° F., 50% R.H. for 6 days.

*Adhesion after jet fuel immersion and adhesion after water immersion.*—Adhesion of the samples on adhesion panels as prepared above were similarly determined after immersion in jet fuel JP-4 (MIL–H–3136) at room temperature for 72 hours and in water for 48 hours.

*Adhesion after ultraviolet light exposure.*—Adhesion was measured after conditioning the tape by exposing the adhesive mass thereof to an S–1 sunlamp bulb for 96 hours at a distance of 30½ inches.

*Oil immersion.*—A length of tape 1 inch wide and 6 inches long was wrapped around a 1″ x 3″ microslide width-wise and heated for 8 hours at 100° C. The assembly was covered with a sufficient amount of mineral transformer oil (see "Standard Handbook for Electrical Engineers," Knowlton, Section 4, page 572) and heated at 100° C. for 11 days. At the end of this period, examination was made to determine whether the adhesion of the tape end from an underlying ply of the tape backing was affected. Those tapes which failed to adhere to their own backing after such exposure were considered to fail this test.

From the data present in the foregoing table, it is immediately apparent that the adhesives formed in accordance with this invention exhibit characteristics vastly superior to those exhibited by the compositions including other elastomers and by the compositions including a tackifying resin other than that described herein. The adhesion values of the products formed in accordance with this invention clearly distinguish them from the comparative examples not in accordance with the invention. It is to be particularly noted that while the use of a butadiene-acrylonitrile elastomer enables the formation of an adhesive which can pass the oil immersion test, the poor adhesion of such an adhesive after immersion in a hydrocarbon such as jet fuel or after exposure to ultraviolet light renders it unsuitable for the purposes intended for the products of this invention.

In addition to the foregoing table, the following are examples of normally tacky and pressure-sensitive adhesives formed in accordance with this invention and containing varying amounts of the components suitable for use therein.

|   | Parts |
|---|---|
| A. Copolymer ethyl acrylate and about 5% beta chloro ethyl vinyl ether | 100 |
| Aryl sulfonamide-formaldehyde condensate | 20 |
| Methyl glycol phthalate | 30 |
| B. Copolymer ethyl acrylate and about 5% beta chloro ethyl vinyl ether | 100 |
| Aryl sulfonamide-formaldehyde condensate | 150 |
| Ethyl glycol phthalate | 25 |
| C. Copolymer ethyl acrylate and about 5% beta chloro ethyl vinyl ether | 100 |
| Aryl sulfonamide-formaldehyde condensate | 80 |
| Tricresyl phosphate | 18 |
| D. Copolymer ethyl acrylate and about 5% beta chloro ethyl vinyl ether | 100 |
| Aryl sulfonamide-formaldehyde condensate | 140 |
| Butyl benzyl phthalate | 30 |
| E. Copolymer of 88 parts butyl acrylate and 12 parts acrylonitrile | 100 |
| Aryl sulfonamide-formaldehyde condensate | 110 |
| Methyl glycol phthalate | 16 |
| F. Copolymer of 95 parts ethyl acrylate and 5 parts acrylonitrile | 100 |
| Aryl sulfonamide-formaldehyde condensate | 150 |
| Methyl glycol phthalate | 30 |
| Calcium carbonate | 15 |
| G. Copolymer ethyl acrylate and about 5% beta chloro ethyl vinyl ether | 100 |
| Aryl sulfonamide-formaldehyde condensate | 100 |
| Methyl glycol phthalate | 23 |
| ZnO | 25 |
| H. Copolymer ethyl acrylate and about 5% beta chloro ethyl vinyl ether | 100 |
| Aryl sulfonamide-formaldehyde condensate | 120 |
| Ethyl glycol phthalate | 30 |
| Calcium carbonate | 50 |
| I. Copolymer ethyl acrylate and about 5% beta chloro ethyl vinyl ether | 100 |
| Phenol-formaldehyde condensate | 90 |
| Methyl glycol phthalate | 30 |
| J. Copolymer ethyl acrylate and about 5% beta chloro ethyl vinyl ether | 100 |
| Phenol-formaldehyde condensate | 140 |
| Methyl glycol phthalate | 20 |
| Calcium carbonate | 25 |
| K. Copolymer of 88 parts butyl acrylate and 12 parts acrylonitrile | 100 |
| Phenol-formaldehyde condensate (Resinox 455) | 60 |
| Ethyl glycol phthalate | 18 |

Each of the foregoing adhesives, both containing and excluding filler, when coated on a suitable backing exhibit characteristics substantially similar to those exhibited by the compositions formed in accordance with the invention and listed in the foregoing table.

Conventional flexible backings for normally tacky and pressure-sensitive adhesive tapes may be employed as the backing elements of the adhesive tapes formed in accordance with this invention, provided the backings themselves are not adversely affected by water or the hydrocarbon solvents to which the particular tape incorporating such a backing must be resistant. The tapes of this invention may be formed with backings of conventional polymeric film materials such as cellulose acetate, polyethylene, vinyl chloride, vinyl chloride-acetate copolymers, polyesters, polyamides, polychloroprene, etc., or may include suitably impregnated or coated fibrous webs of paper or cloth where the impregnant employed is selected for its water and solvent resistance.

The adhesive may be compounded in any conventional manner and coated from solution directly on such backings as is well known. Alternatively, if desired, a primer may be coated on the backing and the adhesive coated on the primer. Tapes exhibiting excellent adhesive mass anchorage have been formed including the adhesives of this invention, when employing as a primer a composition comprising from 25 to 75% of an acrylate polymer of the type suitable for use in the adhesives of this invention and, correspondingly, 75 to 25% of a copolymer of butadiene and acrylonitrile where the acrylonitrile content is of the order of about 15 to 40% by weight of the copolymer. The use of such a primer, preferably where the two polymers are present in substantially equal amounts, enables the formation of a tape structure having outstanding internal strength and resistance to separation of the adhesive from the backing without detracting in any way from the solvent resistance of the entire tape structure.

References is made to the accompanying drawing illustrating a cross-sectional view of a tape formed in accordance with the present invention, said tape being a preferred embodiment wherein a primer is employed. As shown in the drawing, the tape comprises a backing 1 having coated on one side a primer coat 2, of the type described hereinabove in detail. A normally tacky and pressure-sensitive adhesive coat 3, of the type described hereinabove in detail, is anchored to the backing 1 by means of the primer coat 2.

It will be appreciated that many variations in the invention described herein may become apparent to those skilled in the art to which this invention applies. It is to be appreciated that such variations are within the concept of the invention described herein and the invention is to be considered limited only by the appended claims.

What is claimed is:

1. A normally tacky and pressure-sensitive adhesive tape, exhibiting excellent adhesive characteristics and resistance to destruction of its properties by essentially aliphatic hydrocarbon solvents, comprising a flexible web coated on at least one major surface thereof with a normally tacky and pressure-sensitive adhesive comprising an elastomeric component consisting essentially of an elastomeric polymer essentially composed of a polyacrylic acid ester of an aliphatic alcohol containing from 1 to 4 carbon atoms and a resin in an amount from about 10 to about 200 parts by weight per 100 parts of the elastomeric polymer comprising a condensate of formaldehyde and a material selected from the group consisting of aryl sulfonamides, phenols, melamine and urea, said resin exhibiting the characteristics of substantial insolubility in water and aliphatic hydrocarbon solvents, and compatibility with the acrylic polymer.

2. A pressure-sensitive adhesive tape according to claim 1 wherein the resin comprises a formaldehyde condensate of an aryl sulfonamide.

3. A pressure-sensitive adhesive tape according to claim 1 wherein the adhesive contains a plasticizer for said elastomeric polymer which is compatible with said elastomeric polymer and tackifying resin.

4. A pressure-sensitive adhesive tape according to claim 3 wherein the plasticizer is of a composition preventing extraction thereof from the adhesive by essentially aliphatic hydrocarbons.

5. A normally tacky and pressure-sensitive adhesive tape exhibiting excellent adhesive characteristics and resistance to destruction of its properties by essentially aliphatic hydrocarbon solvents comprising a flexible web coated on at least one major surface thereof with a primer coating comprising about 25 to 75% by weight of an elastomeric component consisting essentially of an elastomeric polymer essentially composed of a polyacrylic acid ester of an aliphatic alcohol containing from 1 to 4 carbon atoms and 75 to 25% of a copolymer of butadiene and acrylonitrile having an acrylonitrile content of about 15 to 40% by weight of the copolymer, and a normally tacky and pressure-sensitive adhesive coated on said primer coating comprising an elastomeric polymer essentially composed of a polyacrylic acid ester of an aliphatic alcohol containing from 1 to 4 carbon atoms, and a resin in an amount from about 10 to about 200 parts by weight per 100 parts of the elastomeric polymer comprising a condensate of formaldehyde and a material selected from the group consisting of aryl sulfonamides, phenols, melamine and urea, said resin exhibiting the characteristics of substantial insolubility in water and aliphatic hydrocarbon solvents and compatibility with the acrylic polymer.

6. A normally tacky and pressure-sensitive adhesive tape according to claim 5 wherein the primer is composed of substantially equal parts of the acrylic polymer and the butadiene-acrylonitrile copolymer.

7. A pressure-sensitive adhesive tape according to claim 5 wherein the resin comprises a formaldehyde condensate of an aryl sulfonamide.

8. A pressure-sensitive adhesive tape according to claim 5 wherein the adhesive contains a plasticizer for said elastomeric polymer which is compatible with said elastomeric polymer and tackifying resin.

9. A pressure-sensitive adhesive tape according to claim 5 wherein the plasticizer is of a composition preventing extraction thereof from the adhesive by essentially aliphatic hydrocarbons.

10. A normally tacky and pressure-sensitive adhesive tape according to claim 1, wherein the adhesive contains a filler in an amount up to about 75 parts per 100 parts of the elastomeric component.

11. A normally tacky and pressure-sensitive adhesive tape according to claim 10 wherein the filler is calcium carbonate.

12. A normally tacky and pressure-sensitive adhesive tape according to claim 10 wherein the filler is zinc oxide.

References Cited in the file of this patent

UNITED STATES PATENTS

| | | |
|---|---|---|
| 2,321,627 | Rothrock | June 15, 1943 |
| 2,426,257 | Ziegler | Aug. 26, 1947 |
| 2,438,195 | Tierney | Mar. 23, 1948 |
| 2,553,816 | Ebel | May 22, 1951 |
| 2,554,791 | Nickerson | May 29, 1951 |
| 2,555,745 | Hopkins et al. | June 5, 1951 |
| 2,601,016 | Hendricks et al. | June 17, 1952 |
| 2,767,152 | Bierman et al. | Oct. 16, 1956 |

FOREIGN PATENTS

| | | |
|---|---|---|
| 624,764 | Great Britain | June 16, 1949 |